(12) United States Patent
Kim et al.

(10) Patent No.: US 9,085,689 B2
(45) Date of Patent: Jul. 21, 2015

(54) POLYLACTIC ACID STEREOCOMPLEX RESIN COMPOSITION HAVING IMPROVED CRYSTALLIZATION RATE AND METHOD FOR MOLDING THE SAME

(71) Applicant: LOTTE CHEMICAL CORPORATION, Seoul (KR)

(72) Inventors: Seung Hyuk Kim, Daejeon (KR); Hyun Sup Lee, Daejeon (KR); Tae Kyeong No, Gyeongsangbuk-do (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 14/247,326

(22) Filed: Apr. 8, 2014

(65) Prior Publication Data

US 2014/0378595 A1      Dec. 25, 2014

(51) Int. Cl.
| | | |
|---|---|---|
| C08L 67/04 | (2006.01) | |
| B29C 45/00 | (2006.01) | |
| B29C 45/73 | (2006.01) | |
| B29C 71/02 | (2006.01) | |
| B29K 67/00 | (2006.01) | |
| B29K 33/00 | (2006.01) | |
| B29K 105/00 | (2006.01) | |

(52) U.S. Cl.
CPC ............. C08L 67/04 (2013.01); B29C 45/0001 (2013.01); B29C 45/73 (2013.01); B29C 71/02 (2013.01); *B29K 2033/08* (2013.01); *B29K 2067/046* (2013.01); *B29K 2105/0085* (2013.01); *B29K 2105/0088* (2013.01); *B29K 2995/006* (2013.01); *B29K 2995/0041* (2013.01); *C08L 2205/24* (2013.01)

(58) Field of Classification Search
CPC . C08L 67/04; C08L 2205/24; B29C 45/0001; B29C 1/02; B29C 45/73; B29C 2033/08; B29C 2105/0085; B29C 2105/0088; B29C 2995/06; B29C 2995/0041; B29C 2067/046
USPC .................................. 525/410, 411, 415, 450
See application file for complete search history.

(56) References Cited

U.S. PATENT DOCUMENTS

| | | | |
|---|---|---|---|
| 2005/0001358 A1* | 1/2005 | Nakazawa et al. ........ | 264/331.18 |
| 2006/0173133 A1* | 8/2006 | Flexman et al. .............. | 525/191 |
| 2009/0035585 A1* | 2/2009 | Wakaki et al. ................ | 428/446 |
| 2011/0263762 A1* | 10/2011 | Matsuno et al. ................ | 524/95 |
| 2012/0016065 A1* | 1/2012 | Sawada et al. ................ | 524/223 |

FOREIGN PATENT DOCUMENTS

| | | | | |
|---|---|---|---|---|
| JP | 2010-194955 A | 9/2010 | | |
| KR | 10-2010-0055270 A | 5/2010 | | |
| KR | 10-2011-0067238 A | 6/2011 | | |
| KR | 10-2012-0108798 A | 10/2012 | | |
| KR | 10-2012-0122815 A | 11/2012 | | |
| KR | 10-2012-0129500 A | 11/2012 | | |
| KR | 10-2013-0013223 A | 2/2013 | | |
| WO | WO 2010/107014 A1 * | 9/2010 | ............. | C08L 67/04 |

* cited by examiner

*Primary Examiner* — Robert Jones, Jr.
(74) *Attorney, Agent, or Firm* — Sherr & Jiang, PLLC

(57) ABSTRACT

A molding method for obtaining a polylactic acid stereocomplex resin composition solving a limitation according to application of a typical polylactic acid resin composition. The molding method includes an environmentally-friendly material, and having excellent heat resistance and impact resistance. The polylactic acid stereocomplex resin composition includes about 40 to about 91.9 wt % of a crystalline poly L-lactic acid, about 3 to about 50 wt % of a crystalline poly D-lactic acid, about 5 to about 30 wt % of an impact modifier, and about 0.1 to about 2 wt % of a nucleating agent, and a method for molding the same.

7 Claims, 7 Drawing Sheets

POLYLACTIC ACID STEREOCOMPLEX RESIN COMPOSITION HAVING IMPROVED CRYSTALLIZATION RATE AND METHOD FOR MOLDING THE SAME

CROSS-REFERENCE TO RELATED PATENT APPLICATION

This application claims the benefit of Korean Patent Application No. 10-2013-0070328, filed on Jun. 19, 2013, in the Korean Intellectual Property Office, the disclosure of which is incorporated herein in its entirety by reference.

BACKGROUND

The present invention relates to a polylactic acid resin composition and a method for molding the same, and more particularly, to a polylactic acid resin composition having an excellent crystallization rate and mechanical property and a method for molding the same.

Recently, efforts to reduce greenhouse gas have been extensively made against global warming, and development of a biodegradable polymer material degraded in nature has attracted attention as one of the efforts. For a typical polymer, petroleum resources are mainly used as basic raw materials but have a probability of exhaustion in the future, and carbon dioxide generated when the petroleum resources are consumed in a great quantity is considered as a main factor of global warming. Accordingly, the eyes are centered on development and industrial application of a biodegradable polymer using plant resources grown by using carbon dioxide from the air as raw materials.

Among biodegradable resins, a polylactic acid is a polymer using a lactic acid obtained by fermenting starch extracted from plants as a raw material, and a polymer which can be mass-produced due to excellent optical property, heat resistance, and cost balance among biodegradable polymers derived from biomass. The polylactic acid has excellent transparency and hardness as compared to another biodegradable resin, but has the largest drawback in that dynamic properties are poor at high temperatures. That is, when a temperature of the polylactic acid exceeds 60° C. that is a glass transition temperature of the polylactic acid, the polylactic acid is rapidly softened. A polylactic acid stereocomplex including a poly L-lactic acid (PLLA) constituted by only a typical L-lactic acid and a poly D-lactic acid (PDLA) constituted by only a D-lactic acid blended in a molten state is disclosed to solve the aforementioned limitation. The poly L-lactic acid has a spiral structure wound in a left direction, but the poly D-lactic acid has a spiral structure wound in a right direction. When two components are uniformly blended at high temperatures, a stereospecific bond is formed between the two components, thus forming a stereocomplex having a crystalline structure that is stronger than a crystalline structure formed in the case of only the poly L-lactic acid or the poly D-lactic acid. Consequently, the stereocomplex may have a high melting point and high crystallinity as compared to a homopolymer of the poly L-lactic acid or the poly D-lactic acid.

Meanwhile, heat resistance and impact resistance are reduced due to a slow crystallization rate during a molding process of a polylactic acid homopolymer or a stereocomplex resin composition. In review of related preceding documents, Korean Patent Application Laid-Open No. 2012-0108798 discloses a technology of setting a melting temperature to about 190 to about 195° C. in order to preserve a crystal of a stereocomplex of L-type and D-type polylactic acids having a crystallization rate improved through cooling after a cavity surface of a mold is heated to about 100 to about 110° C., but the melting temperature is low, and Korean Patent Application Laid-Open No. 2012-0108798 does not mention a nucleating agent suitable to improve the crystallization rate of the stereocomplex.

Further, Korean Patent Application Laid-Open No. 2012-0122815 discloses a polylactic acid resin composition including an L-type polylactic acid, a D-type polylactic acid, and phyllite powder in appropriate contents, and having improved crystallization rate, impact resistance, and heat distortion temperature, and mentions phyllite powder as the nucleating agent.

Further, Korean Patent Application Laid-Open No. 2012-0129500 discloses a polylactic acid composition having an improved mechanical property and crystallization rate by applying phyllite powder and carbon nanotubes which are subjected to organification surface treatment to a polylactic acid, and mentions phyllite powder and the carbon nanotubes as the nucleating agent for improving physical properties but not the stereocomplex as the polylactic acid.

Further, Korean Patent Application Laid-Open No. 2011-0067238 discloses a polylactic acid complex having improved compatibility and heat resistance, but does not propose specific application of a resin composition and a method for improving processability.

SUMMARY

Accordingly, the present invention has been made in an effort to solve the aforementioned limitations, and provides a polylactic acid stereocomplex resin composition having an improved crystallization rate by a molding method for obtaining the polylactic acid stereocomplex resin composition solving a limitation according to application of a typical polylactic acid resin composition, including an environmentally-friendly material, and having excellent heat resistance and impact resistance, a method for molding the same, and a molded article by the molding method.

In order to solve the aforementioned limitation, the present invention provides a polylactic acid stereocomplex resin composition including (A) about 40 to about 91.9 wt % of a crystalline poly L-lactic acid, (B) about 3 to about 50 wt % of a crystalline poly D-lactic acid, (C) about 5 to about 30 wt % of an impact modifier, and (D) about 0.1 to about 2 wt % of a nucleating agent.

Further, the present invention provides the polylactic acid stereocomplex resin composition in which (A) the crystalline poly L-lactic acid includes about 95 wt % or more of an L form, and (B) the crystalline poly D-lactic acid includes about 98 wt % or more of a D form.

Further, the present invention provides the polylactic acid stereocomplex resin composition in which (A) the crystalline poly L-lactic acid and (B) the crystalline poly D-lactic acid each have a weight average molecular weight of about 40,000 to about 200,000.

Further, the present invention provides the polylactic acid stereocomplex resin composition in which (C) the impact modifier is one or more selected from the group consisting of an acrylate-based copolymer impact modifier, an ethylene-alphaolefin-based impact modifier, a methyl methacrylate-butadiene-styrene-based impact modifier, a silicon-based impact modifier, and a polyester elastomer impact modifier.

Further, the present invention provides the polylactic acid stereocomplex resin composition in which (D) the nucleating agent is a talc-based nucleating agent or a sodium phosphate-based nucleating agent.

Further, the present invention provides the polylactic acid stereocomplex resin composition in which the complex resin composition has a heat distortion temperature (ASTM D-648) of about 100° C. or more and IZOD impact strength (ASTM D-256) of about 10 kg-cm/cm or more.

In order to solve another limitation, the present invention provides a method for molding a polylactic acid stereocomplex resin composition in an injection molding condition, which includes providing the polylactic acid stereocomplex resin composition processed at an extrusion temperature of about 210 to about 230° C. into a cavity maintained at a surface temperature of about 100 to about 120° C., and performing maintenance and crystallization for about 3 to about 6 minutes, and then cooling a surface of the cavity to about 40 to about 60° C. to extract a molded article.

Further, the present invention provides the method for molding the polylactic acid stereocomplex resin composition, in which the cooling is performed at a rate of about 60° C./min or more.

Further, the present invention provides the method for molding the polylactic acid stereocomplex resin composition, in which the extracted molded article is heat-treated at about 90° C. to about 120° C. for about 10 to about 60 minutes.

In order to solve yet another limitation, the present invention provides a molded article molded by the aforementioned method.

For the polylactic acid stereocomplex resin composition according to the present invention and the molding method using the same, an acrylate-based copolymer is applied as an impact modifier to improve impact strength, a crystallization rate of a resin is increased through a nucleating agent having a predetermined composition to contribute to an increase in moldability, an optimum molding method under an injection molding condition and a polylactic acid stereocomplex resin composition optimally suitable for the method are provided through modification of a surface temperature of a mold cavity and heat treatment of a molded article, and thus the crystallization rate is improved during molding under the injection molding condition to provide the molded article having excellent heat resistance, impact strength, and injection molding rate as compared to a typical polylactic acid resin composition. Accordingly, it is expected that the polylactic acid stereocomplex resin composition is variously applied as industrial materials such as interior materials for vehicles, part materials, and home appliances, and henceforward, will have a great industrial ripple effect as an environmentally-friendly material capable of coping with a regulation of a reduction in carbon dioxide.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
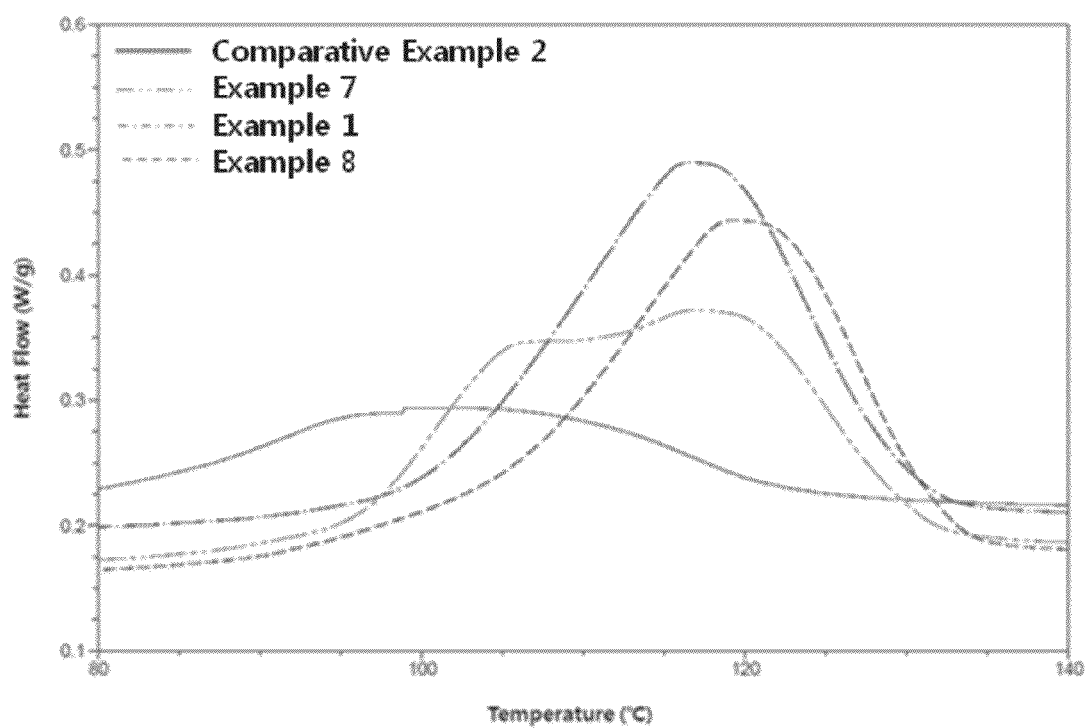
FIG. 1 is a graph showing a measurement result of a change in calorie and crystallization temperature of a polylactic acid stereocomplex resin crystal according to a content of a talc nucleating agent using a differential scanning calorimeter when a measurement temperature is increased to about 190° C. and then decreased.
Figure 2:
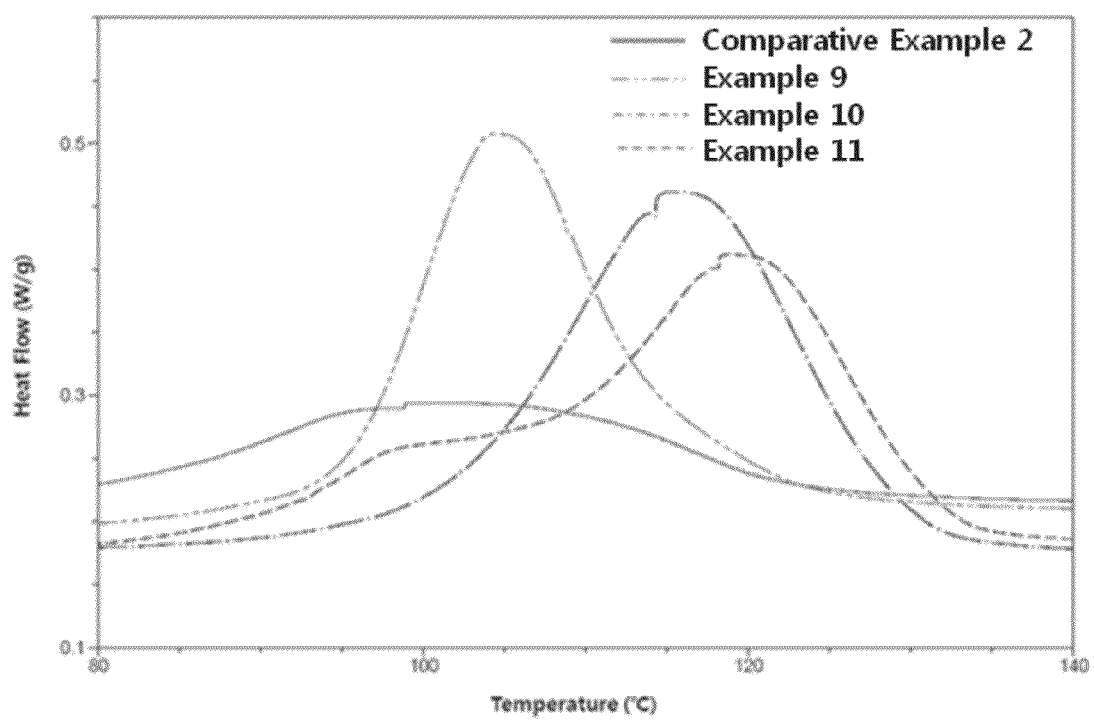
FIG. 2 is a graph showing a measurement result of a change in calorie and crystallization temperature of the polylactic acid stereocomplex resin crystal according to a content of a sodium phosphate-based nucleating agent using the differential scanning calorimeter when the measurement temperature is increased to about 190° C. and then decreased.
Figure 3:
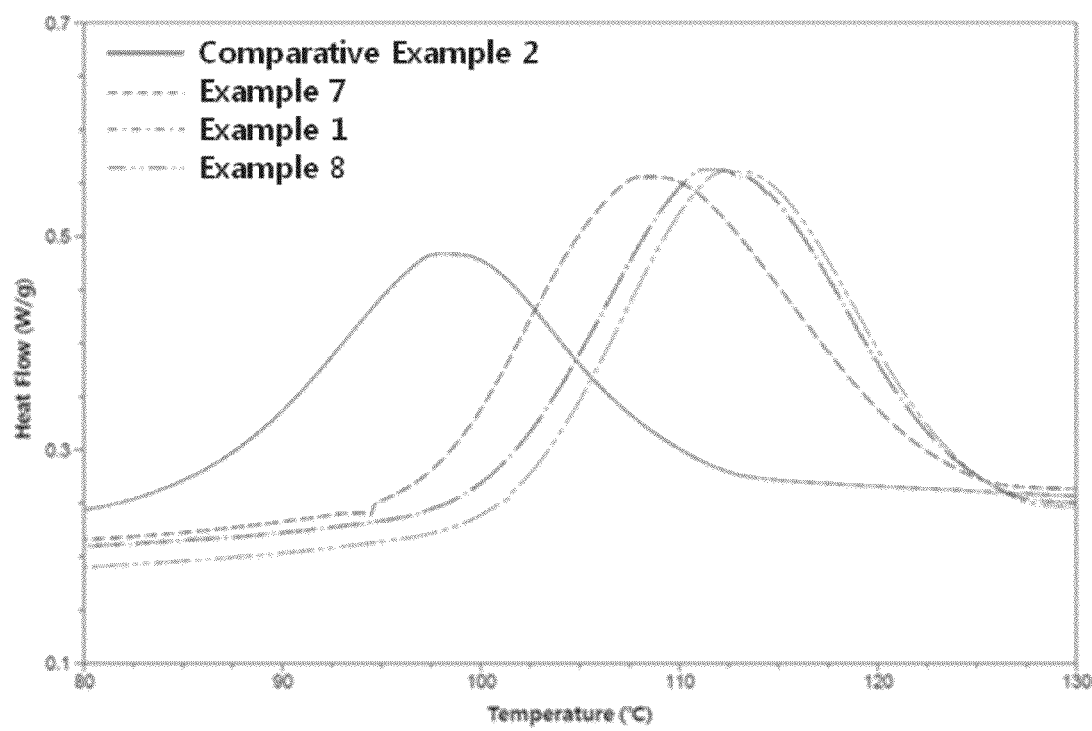
FIG. 3 is a graph showing a measurement result of a change in calorie and crystallization temperature of the polylactic acid stereocomplex resin crystal according to the content of the talc nucleating agent using the differential scanning calorimeter when the measurement temperature is increased to about 250° C. and then decreased.
Figure 4:
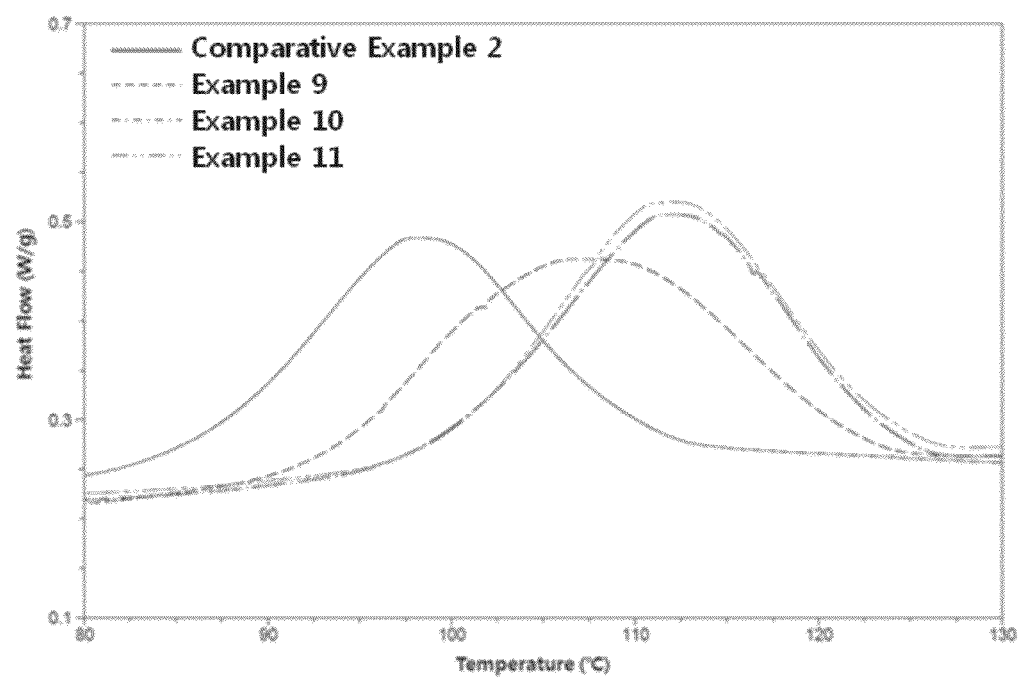
FIG. 4 is a graph showing a measurement result of a change in calorie and crystallization temperature of the polylactic acid stereocomplex resin crystal according to the content of the sodium phosphate-based nucleating agent using the differential scanning calorimeter when the measurement temperature is increased to about 250° C. and then decreased.

The present invention will now be described more fully with reference to the accompanying drawings, in which exemplary embodiments of the invention are shown.

Hereinafter, the present invention will be described in detail through the preferred embodiments. Prior to this, terms or words used in the present specification and claims should not be interpreted as being limited to typical or dictionary meanings, but should be interpreted as having meanings and concepts which comply with the technical spirit of the present invention, based on the principle that an inventor can appropriately define the concept of the term to describe his/her own invention in the best manner. Accordingly, the constitution of the embodiment described in the present specification is just the most preferred embodiment of the present invention but does not indicate all technical spirits of the present invention. Therefore, it should be understood that there are various equivalents and modifications replacing the embodiments at the time of filing of the present application.

A stereocomplex of a polylactic acid has a high crystallization rate as compared to a homopolymer. This is because a D-type polylactic acid acts as a nucleating agent to increase the degree of crystallization and the crystallization rate. However, there is a drawback in that the degree of improvement of the crystallization rate to a high price and a content of the D-type polylactic acid has low competitiveness as compared to a predetermined nucleating agent. Therefore, the present inventors faced squarely a demand for addition of the predetermined nucleating agent in order to increase the crystallization rate of the stereocomplex. Further, for the low crystallization rate of the polylactic acid stereocomplex and injection molding using the same, cooling is performed at a crystallization temperature or less during cooling after molding by a general low temperature mold to obtain extraction in an amorphous state, and thus heat resistance and impact resistance are reduced and extraction is not easily performed to reduce dimensional stability. The present inventors found that a polylactic acid resin composition manufactured under a process condition in consideration of a melting temperature of the polylactic acid stereocomplex is used as a polylactic acid resin composition having a predetermined composition to dramatically improve heat resistance, impact resistance, and dimensional stability of a molded article according to an increase in crystallization rate and degree of crystallization through crystallization obtained by adjusting a surface temperature of a cavity at a glass transition temperature or more and a melting temperature or less under an injection molding condition and heat treatment of the extracted molded article, thereby accomplishing the present invention. Hereinafter, the polylactic acid resin composition according to the present invention will be described in detail, and a method for molding the polylactic acid resin composition will be then described in detail.

The present invention discloses a polylactic acid stereocomplex resin composition including (A) about 40 to about 91.9 wt % of a crystalline poly L-lactic acid, (B) about 3 to about 50 wt % of a crystalline poly D-lactic acid, (C) about 5 to about 30 wt % of an impact modifier, and (D) about 0.1 to about 2 wt % of a nucleating agent. Hereinafter, each constituent component of the polylactic acid stereocomplex resin composition according to the present invention will be described in more detail.

(A) and (B) Polylactic Acid (PLA) Resins

Generally, the polylactic acid is a polyester-based resin manufactured by an esterification reaction using a lactic acid obtained by decomposing cornstarch as a monomer, and a structure thereof is shown in the following Chemical Formula 1.

[Chemical Formula 1]

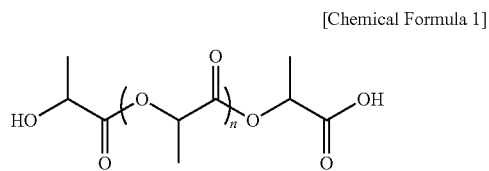

The polylactic acid resin is classified into the poly L-lactic acid constituted by a repeating unit derived from an L-isomer lactic acid and the poly D-lactic acid constituted by a repeating unit derived from a D-isomer lactic acid, and the poly L-lactic acid and the poly D-lactic acid may be used alone or in combination but, in the present invention, are used in combination to improve a dynamic property at high temperatures.

The poly L-lactic acid resin has preferably about 95 wt % or more, more preferably about 97 wt % or more, and most preferably about 99 wt % or more of the repeating unit derived from the L-isomer lactic acid in views of a balance of heat resistance and moldability. Further, the poly D-lactic acid resin has preferably about 98 wt % or more and more preferably about 99 wt % or more of the repeating unit derived from the D-isomer lactic acid in order to form a stereocomplex in views of a balance of heat resistance and moldability.

Further, a molecular weight or a molecular weight distribution of the poly L-lactic acid resin and the poly D-lactic acid resin is not particularly limited as long as molding processing is feasible, but the weight average molecular weight is preferably about 40,000 or more and more preferably about 40,000 to about 200,000 in views of a balance of mechanical strength and heat resistance of a molded body.

In the present invention, the poly L-lactic acid resin is included in a content of about 40 to about 91.9 wt % and preferably about 50 to about 83.9 wt %. When the content of the poly L-lactic acid resin is less than about 40 wt %, the content of the poly D-lactic acid resin may be relatively increased to have a disadvantage in views of an economic aspect of raw materials, when the content is more than about 91.9 wt %, impact strength and moldability of the resin composition may be reduced due to formation of the stereocomplex and a reduction in degree of crystallization. Further, the poly D-lactic acid resin is included in a content of about 3 to about 50 wt % and preferably about 7 to about 30 wt %. When the content of the poly D-lactic acid resin is less than about 3 wt %, the content of the poly L-lactic acid resin is relatively increased and thus the stereocomplex may be difficult to form, and when the content is more than about 50 wt %, there is an advantage in formation of the stereocomplex but there may be a disadvantage in views of an economic aspect of raw materials.

(C) Impact Modifier

The impact modifier used in the present invention is a component useful to improve compatibility between a hydroxy group and a carboxy group of the polylactic acid to improve impact strength in the polylactic acid stereocomplex resin composition, and is included in a content of about 5 to about 30 wt % and preferably about 9 to about 20 wt % in order to maintain appropriate impact strength. When the content of the impact modifier is less than about 5 wt %, hardness is increased but an impact of the resin composition is reduced, and thus the impact modifier may be difficult to be applied to packing materials or plastic parts for vehicles, and when the content is more than about 30 wt %, impact resistance of the resin composition is increased but hardness is reduced, and thus the impact modifier may be difficult to be applied to products due to a poor balance of physical properties.

An acrylate-based copolymer is preferable as the impact modifier but the impact modifier is not limited thereto, and, for example, an ethylene-n-butyl acrylate-glycidyl methacrylate-based impact modifier, an ethylene-alphaolefin-based impact modifier, a methyl methacrylate-butadiene-styrene-based impact modifier, a silicon-based impact modifier, and a polyester elastomer impact modifier may be used.

(D) Nucleating Agent

The nucleating agent used in the present invention is an additive useful to improve processing productivity by reducing sizes of crystals of the polylactic acid and the polylactic acid stereocomplex resin, and reducing a crystallization time according to an increase in degree of crystallization to reducing a processing time during injection and other processing. A D-type polylactic acid may act as the nucleating agent, but since an effect of the nucleating agent according to the high resin price and contents is lower than that of the nucleating agent used in the present invention, an additional nucleating agent should be added to increase a molding rate. The nucleating agent is included in a content of about 0.1 to about 2 wt % in order to ensure an appropriate crystallization rate. When the content of the nucleating agent is less than about 0.1 wt %, performance of the nucleating agent may be difficult to be ensured, and when the content is more than about 2 wt %, both the degree of crystallization and hardness of the resin are increased, and thus a balance of physical properties of the resin may not be obtained due to a reduction in impact strength.

A talc-based nucleating agent or a sodium phosphate-based nucleating agent is preferable as the nucleating agent, and, for example, a methylenebis(4,6-di-tert-butylphenol) phosphate sodium salt may be used as the sodium phosphate-based nucleating agent.

Hereinafter, the method for molding the polylactic acid resin composition according to the present invention will be described in detail.

The present invention discloses the method for molding the polylactic acid stereocomplex resin composition in an injection molding condition, which includes providing the polylactic acid stereocomplex resin composition processed at an extrusion temperature of about 210 to about 230° C. into a cavity maintained at a surface temperature of about 100 to about 120° C., and performing maintenance and crystallization for about 3 to about 6 minutes, and then cooling a surface of the cavity to about 40 to about 60° C. to extract a molded article.

The molding method according to the present invention is appropriate in the case where the polylactic acid stereocomplex resin composition is applied as the polylactic acid resin composition, and most appropriate in the case where the polylactic acid stereocomplex resin composition including (A) about 40 to about 91.9 wt % of the crystalline poly L-lactic acid, (B) about 3 to about 50 wt % of the crystalline poly D-lactic acid, (C) about 5 to about 30 wt % of the impact modifier, and (D) about 0.1 to about 2 wt % of the nucleating agent is applied. Hereinafter, the case where the polylactic acid stereocomplex resin composition according to a predetermined composition is applied will be described as an example.

According to the present invention, when components (A) to (D) are mixed and blended, a temperature of a screw of an extruder should be maintained at about 210 to about 230° C. This is because in consideration of a melting temperature (about 214 to about 216° C.) of a stereocrystal, embodying of a function of the composition by an increase in degree of kneading of the polylactic acid, the impact modifier, and the nucleating agent when kneading is performed at a temperature of the melting temperature or more is relatively advantageous. In this case, when the extrusion temperature is less than about 210° C., the degree of kneading of the polylactic acid, the impact modifier, and the nucleating agent is reduced, and thus it may be difficult to expect improvement of the mechanical property and the crystallization rate, and when the extrusion temperature is more than about 230° C., thermal decomposition of the resin occurs, and thus processability and the mechanical property of the resin may be reduced.

In the present invention, a mold where a temperature can be adjusted is used, a temperature of an inner surface of a mold cavity is maintained at about 100 to about 120° C. and preferably about 110 to about 120° C. in order to improve the crystallization rate of the resin composition when the polylactic acid resin composition is provided into the mold cavity, and thus the degree of crystallization of the resin is improved during cooling in a crystallization temperature (about 100° C.) region of the stereocomplex resin to improve heat resistance and impact resistance. When the surface temperature is less than about 100° C., a crystallization time may be increased, and thus there is a possibility of deterioration due to retention of the resin, when the surface temperature is more than about 120° C., the surface temperature may approach a melting point of the polylactic acid complex resin composition to cause hardship for crystallization.

Subsequently, after the polylactic acid resin composition is provided into the cavity, the retention time may be maintained at about 3 to about 6 minutes and preferably about 4 to about 5 minutes in a mold closure state at the surface temperature of about 100 to about 120° C. when a molded product is cooled, thus causing sufficient crystallization. When the retention time is less than about 3 minutes, sufficient crystallization does not occur, and thus heat resistance of the molded article may be reduced, and when the retention time is more than about 6 minutes, sufficient crystallization occurs, but a molding time may be increased to reduce production efficiency.

Subsequently, for the purpose of smooth extraction (release) of the molded article, the surface of the cavity is quenched to about 40 to about 60° C. and preferably about 40 to about 50° C., and maintained for about 5 to about 20 seconds to extract the molded article. When the quenching temperature is less than about 40° C., a cooling time of the mold may be increased as compared to the degree of improvement of an extraction property, and when the quenching temperature is more than about 60° C., the extraction property and moldability of the molded article may be reduced. Further, when a maintaining time after quenching is less than about 5 seconds, the cooling time is not sufficient, and thus the extraction property and moldability of the molded article may be reduced, and when the maintaining time is more than about 20 seconds, the degree of improvement of the extraction property and moldability may be insignificant as compared to an increase in molding cycle. Further, it is preferable that quenching be performed at a cooling rate of about 60° C./min or more to shorten the molding cycle.

Subsequently, it is preferable that heat treatment be performed over the extracted molded article to increase the degree of crystallization of the molded article and improve heat resistance. The heat treatment may be performed between the glass transition temperature and the melting point of the polylactic acid resin composition, and the extracted molded article may be heat-treated at about 90 to about 120° C. and preferably about 100 to about 110° C. for about 10 to about 100 minutes and preferably about 20 to about 60 minutes. When a heat treatment temperature is less than about 90° C. or a heat treatment time is less than about 10 minutes, the degree of crystallization may be insignificantly increased, and when the heat treatment temperature is more than about 120° C. or the heat treatment time is more than about 100 minutes, the heat treatment temperature may approach the melting point of the polylactic acid resin composition or the heat treatment may be excessive, and thus the degree of crystallization may be reduced.

The molded article including the polylactic acid stereocomplex resin composition manufactured by the aforementioned method has a heat distortion temperature (ASTM D-648) of about 100° C. or more and IZOD impact strength (ASTM D-256) of about 10 kg-cm/cm or more, accordingly, has excellent heat resistance and impact resistance. Therefore, there may be provided the molded article using the polylactic acid resin solving a limitation according to application of a typical polylactic acid, including an environmentally-friendly material, and having the excellent mechanical property.

Hereinafter, specific Examples according to the present invention will be described.

First, specifications of components of (A) the poly L-lactic acid resin, (B) the poly D-lactic acid resin, (C) the impact modifier, and (D) the nucleating agent used in the Examples and Comparative Examples of the present invention are as follows.

(A) Poly L-Lactic Acid Resin

Ingeo 3001D (melt index of about 22 g/10 min (about 210° C., about 2.16 kg) and weight average molecular weight of about 40,000 to about 200,000) manufactured by NatureWorks LLC Company in the US was used.

(B) Poly D-Lactic Acid Resin

The poly D-lactic acid (melt index of about 95 g/10 min (about 190° C., about 2.16 kg) and molecular weight of about 40,000 to about 200,000) manufactured by LOTTE CHEMICAL CORPORATION was used.

(C) Impact Modifier

The ethylene-n-butyl acrylate-glycidyl methacrylate copolymer as Elvaloy PTW (melt index of about 12 g/10 min (about 190° C., about 2.16 kg)) manufactured by DuPont Company in the US was used as the acrylate-based copolymer impact modifier.

(D-1) Talc-Based Nucleating Agent

Talc (KCM6300) manufactured by KOCH CORPORATION was used.

(D-2) Sodium Phosphate-Based Nucleating Agent

NA902 (methylenebis(4,6-di-tertiary-butylphenol)phosphate sodium salt) manufactured by ADEKA CORPORATION was used.

COMPARATIVE EXAMPLE 1

(A) about 81 wt % of the poly L-lactic acid resin, (B) about 9 wt % of the poly D-lactic acid resin, (C) about 9 wt % of the impact modifier, and (D-1) about 1 wt % of the talc-based nucleating agent were mixed and extruded in the twin-screw extruder having the L/D of about 25 and the diameter of about 40 mm at the temperature in the range of about 190 to about 200° C., and the extrusion substance was then manufactured to have the pellet shape. After the extruded pellets were dried at about 80° C. for about 12 hours, the ASTM test specimen was injection-molded by using the injection machine (Dongshin Hydraulics, Co., Korea) having clamping force of about 150 tons and equipped with the controller (NX-1) capable of controlling the temperature of the mold to manufacture the physical property specimen. In this case, the injection temperature was set to about 190 to about 200° C., the specimen was maintained at the surface temperature of the mold cavity of about 100 to about 120° C. for about 4 to about 5 minutes, and the surface temperature of the cavity was reduced to about 40 to about 50° C. to extract the molded product. Subsequently, the specimen was molded by performing heat treatment at about 90 to about 120° C. for about 60 minutes in order to increase the degree of crystallization.

COMPARATIVE EXAMPLE 2

(A) about 82 wt % of the poly L-lactic acid resin, (B) about 9 wt % of the poly D-lactic acid resin, and (C) about 9 wt % of the impact modifier were mixed and extruded in the twin-screw extruder having the L/D of about 25 and the diameter of about 40 mm at the temperature in the range of about 210 to about 230° C., and the extrusion substance was then manufactured to have the pellet shape. After the extruded pellets were dried at about 80° C. for about 12 hours, the ASTM test specimen was injection-molded by using the injection machine (Dongshin Hydraulics, Co., Korea) having clamping force of about 150 tons and equipped with the controller (NX-1) capable of controlling the temperature of the mold to manufacture the physical property specimen. In this case, the injection temperature was set to about 210 to about 230° C., the specimen was maintained at the surface temperature of the mold cavity of about 100 to about 120° C. for about 4 to about 5 minutes, and the surface temperature of the cavity was reduced to about 40 to about 50° C. to extract the molded product. Subsequently, the specimen was molded by performing heat treatment at about 90 to about 120° (C for about 60 minutes in order to increase the degree of crystallization.

EXAMPLE 1

The specimen was molded by the same method as Comparative Example 2, except that (A) about 81 wt % of the poly L-lactic acid resin, (B) about 9 wt % of the poly D-lactic acid resin, (C) about 9 wt % of the impact modifier, and (D-1) about 1 wt % of the talc-based nucleating agent were mixed in Comparative Example 2.

EXAMPLE 2

The specimen was molded by the same method as Comparative Example 2, except that (A) about 78 wt % of the poly L-lactic acid resin, (B) about 9 wt % of the poly D-lactic acid resin, (C) about 12 wt % of the impact modifier, and (D-1) about 1 wt % of the talc-based nucleating agent were mixed in Comparative Example 2.

EXAMPLE 3

The specimen was molded by the same method as Comparative Example 2, except that (A) about 74 wt % of the poly L-lactic acid resin, (B) about 8 wt % of the poly D-lactic acid resin, (C) about 17 wt % of the impact modifier, and (D-1) about 1 wt % of the talc-based nucleating agent were mixed in Comparative Example 2.

EXAMPLE 4

The specimen was molded by the same method as Comparative Example 2, except that (A) about 78 wt % of the poly L-lactic acid resin, (B) about 7.7 wt % of the poly D-lactic acid resin, (C) about 14 wt % of the impact modifier, and (D-2) about 0.3 wt % of the sodium phosphate-based nucleating agent were mixed in Comparative Example 2.

EXAMPLE 5

The specimen was molded by the same method as Comparative Example 2, except that (A) about 75 wt % of the poly L-lactic acid resin, (B) about 7.7 wt % of the poly D-lactic acid resin, (C) about 17 wt % of the impact modifier, and (D-2) about 0.3 wt % of the sodium phosphate-based nucleating agent were mixed in Comparative Example 2.

EXAMPLE 6

The specimen was molded by the same method as Comparative Example 2, except that (A) about 78 wt % of the poly L-lactic acid resin, (B) about 7.4 wt % of the poly D-lactic acid resin, (C) about 14 wt % of the impact modifier, and (D-2) about 0.6 wt % of the sodium phosphate-based nucleating agent were mixed in Comparative Example 2.

EXAMPLE 7

The specimen was molded by the same method as Comparative Example 2, except that (A) about 81.5 wt % of the poly L-lactic acid resin, (B) about 9 wt % of the poly D-lactic acid resin, (C) about 9 wt % of the impact modifier, and (D-1) about 0.5 wt % of the talc-based nucleating agent were mixed in Comparative Example 2.

EXAMPLE 8

The specimen was molded by the same method as Comparative Example 2, except that (A) about 80.5 wt % of the poly L-lactic acid resin, (B) about 9 wt % of the poly D-lactic acid resin, (C) about 9 wt % of the impact modifier, and (D-1) about 1.5 wt % of the talc-based nucleating agent were mixed in Comparative Example 2.

EXAMPLE 9

The specimen was molded by the same method as Comparative Example 2, except that (A) about 81.5 wt % of the poly L-lactic acid resin, (B) about 9 wt % of the poly D-lactic acid resin, (C) about 9 wt % of the impact modifier, and (D-2)

about 0.5 wt % of the sodium phosphate-based nucleating agent were mixed in Comparative Example 2.

EXAMPLE 10

The specimen was molded by the same method as Comparative Example 2, except that (A) about 81 wt % of the poly L-lactic acid resin, (B) about 9 wt % of the poly D-lactic acid resin, (C) about 9 wt % of the impact modifier, and (D-2) about 1 wt % of the sodium phosphate-based nucleating agent were mixed in Comparative Example 2.

EXAMPLE 11

The specimen was molded by the same method as Comparative Example 2, except that (A) about 80.5 wt % of the poly L-lactic acid resin, (B) about 9 wt % of the poly D-lactic acid resin, (C) about 9 wt % of the impact modifier, and (D-2) about 1.5 wt % of the sodium phosphate-based nucleating agent were mixed in Comparative Example 2.

Component compositions and processing conditions of the resin composition manufactured according to the Examples and the Comparative Examples are described in the following Table 1.

TABLE 1

| Classification | Poly L-lactic acid resin (wt %) | Poly D-lactic acid resin (wt %) | Impact modifier (wt %) | Talc-based nucleating agent (wt %) | Sodium phosphate-based nucleating agent (wt %) | Processing temperature (° C.) |
|---|---|---|---|---|---|---|
| Comparative example 1 | 81 | 9 | 9 | 1 | — | 190-200 |
| Comparative example 2 | 82 | 9 | 9 | — | — | 210-230 |
| Example 1 | 81 | 9 | 9 | 1 | — | |
| Example 2 | 78 | 9 | 12 | 1 | — | |
| Example 3 | 74 | 8 | 17 | 1 | — | |
| Example 4 | 78 | 7.7 | 14 | — | 0.3 | |
| Example 5 | 75 | 7.7 | 17 | — | 0.3 | |
| Example 6 | 78 | 7.4 | 14 | — | 0.6 | |
| Example 7 | 81.5 | 9 | 9 | 0.5 | — | |
| Example 8 | 80.5 | 9 | 9 | 1.5 | — | |
| Example 9 | 81.5 | 9 | 9 | — | 0.5 | |
| Example 10 | 81 | 9 | 9 | — | 1 | |
| Example 11 | 80.5 | 9 | 9 | — | 1.5 | |

TEST EXAMPLE 1

Figure 6:
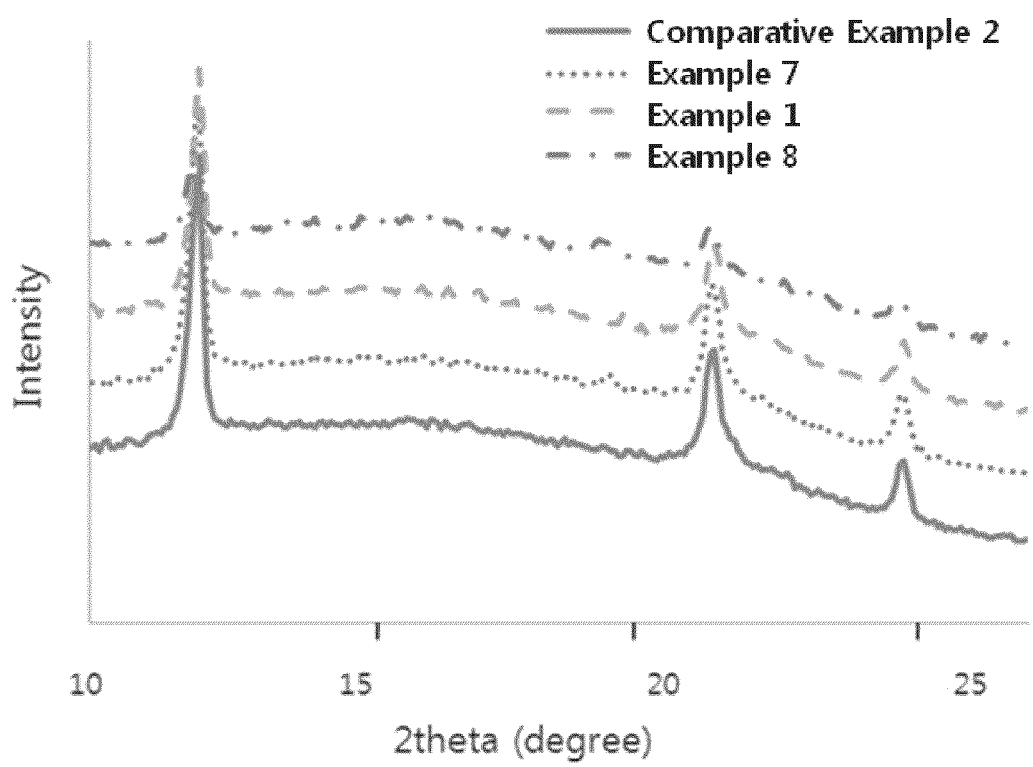
FIGS. 6 and 7 are graphs showing wide-angle X-ray diffraction analysis results for confirming crystal formation of the polylactic acid stereocomplex resin.
Figure 7:
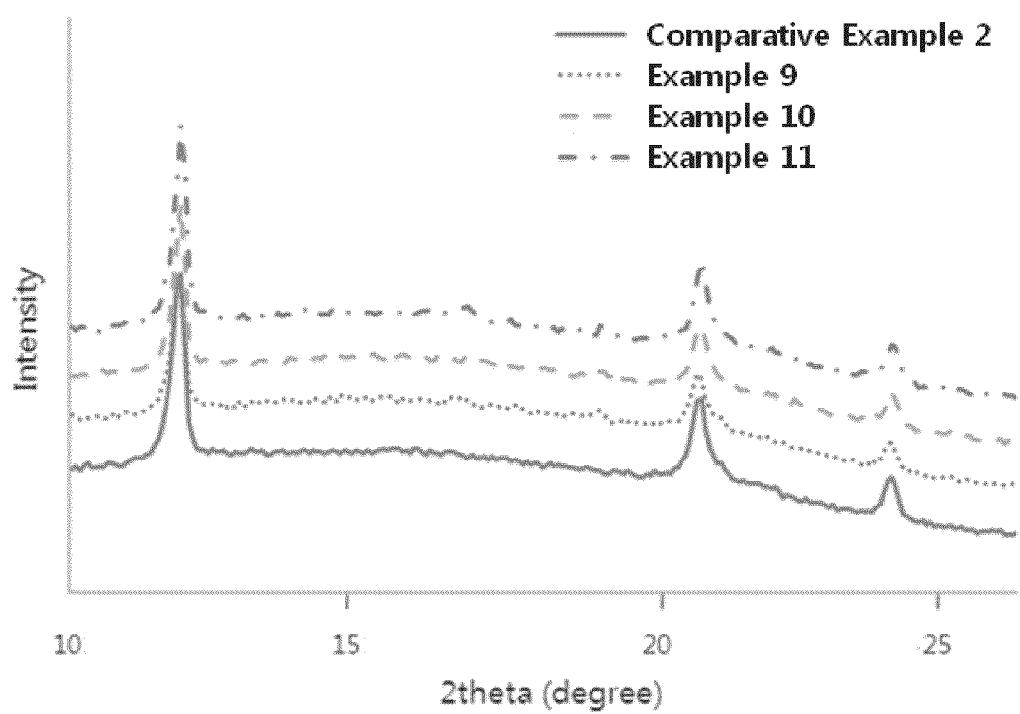

In order to confirm a crystallization behavior according to the content of the nucleating agent of the polylactic acid complex resin composition according to the present invention, the specimens manufactured according to Comparative Example 2, Example 1, and Examples 7 to 11 were subjected to thermal analysis by the following method and isothermal crystallization measurement was performed, and the results are shown in FIGS. 1 to 5. In order to confirm formation of a polylactic acid stereocomplex resin crystal, wide-angle X-ray diffraction analysis (WAXD analysis, D/MAX-2500, RIGAKU) was performed in the following condition, and the results are shown in FIGS. 6 and 7.

[Measurement Method]

Measurement was performed by using the differential scanning calorimeter (DSC) equipment (DSC Q200, TA Instrument) under nitrogen, for each specimen, after i) the temperature was increased at a rate of about 20° C./min from about 30° C. to about 190° C. (see FIGS. 1 and 2) and ii) the temperature was increased at a rate of about 20° C./min from about 30° C. to about 250° C. (see FIGS. 3 and 4), the specimens were quenched at a rate of about 80° C./min, and measurement results for each isothermal crystallization temperature were compared. The results are shown in FIGS. 1 to 4.

Figure 5:
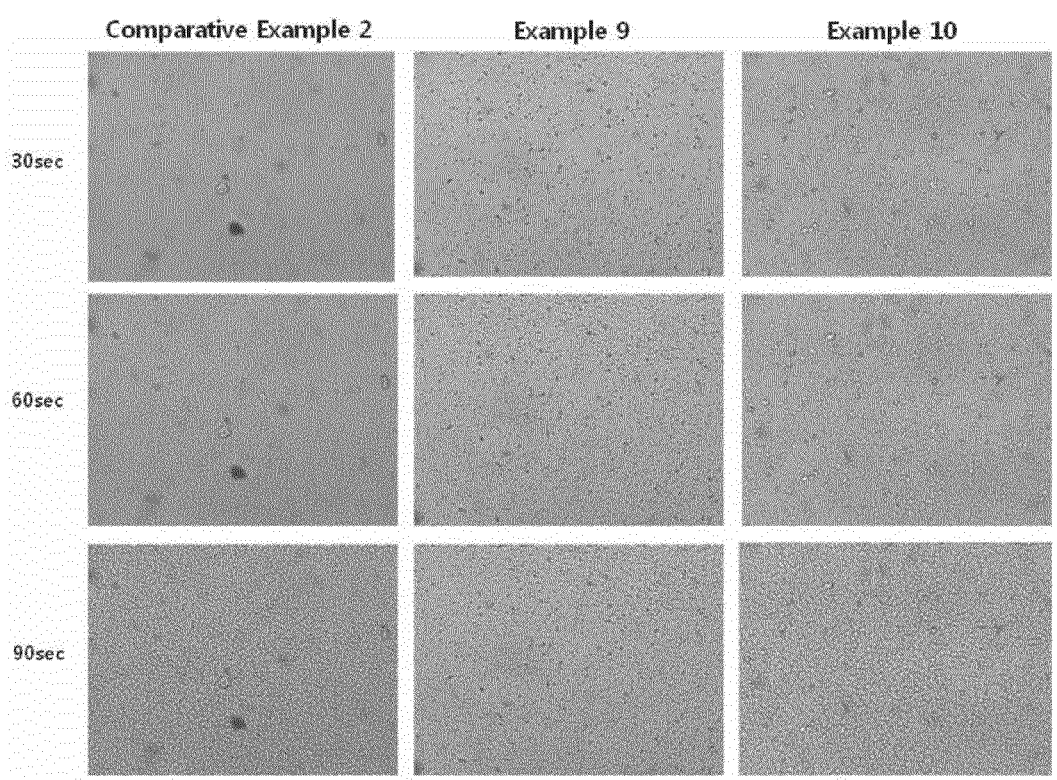
FIG. 5 is a picture showing a change in crystallinity of a polylactic acid stereocomplex resin according to a time for each content of the sodium phosphate-based nucleating agent using a polarization microscope.

Further, FIG. 5 shows a polarization microscope picture (LV100 POL, NIKON, Japan) showing a change in crystallinity of the polylactic acid complex resin over time for each content of the sodium phosphate-based nucleating agent measured at the isothermal crystallization temperature of about 100° C.

[Analysis Condition]

Monochrome CuKα radiation (λ=about 1.542 Å) was used as the X-ray beam, and the refraction angle reported by a-aluminum oxides was set as the standard. The angle of a refraction pattern is revised by the refraction angle of α-aluminum oxides to the CuKα radiation.

First, referring to FIGS. 1 to 4, it can be seen that the crystallization temperature is increased as the content of the nucleating agent is increased and the calorie of the crystal portion when the temperature of the differential scanning calorimeter is increased to about 250° C. and then reduced is higher than the calorie of the crystal portion when the temperature of the differential scanning calorimeter is increased to about 190° C. and then reduced. Therefore, it can be confirmed that the temperature enough to manifest the nucleating agent is required and the temperature that is higher than the melting temperature of the polylactic acid stereocomplex resin is appropriate.

Further, referring to FIG. 5, the crystallization rate of the complex resin to which the sodium phosphate-based nucleating agent is added is increased as compared to the polylactic acid stereocomplex resin to which the nucleating agent is not added. This can be confirmed from formation of the crystal in the complex resin to which the nucleating agent is added within about 30 seconds after measurement.

Further, referring to FIG. 6, formation of the crystal of the polylactic acid stereocomplex resin according to the type and the content of the nucleating agent may be confirmed at peaks of 2 theta 12.0, 20.9, and 24.0.

TEST EXAMPLE 2

The heat distortion temperature, IZOD impact strength at normal temperature, and the crystallization time of the specimens manufactured according to Comparative Examples 1 and 2 and Examples 1 to 6 were measured according to the following method, and the results are described in the following Table 2.

[Measurement Method]

(1) Heat distortion temperature: The heat distortion temperature was measured based on ASTM D648.

(2) IZOD impact strength at normal temperature: The impact strength was measured based on ASTM D256.

(3) Crystallization time: The crystallization time was measured at the isothermal crystallization temperature of about 100° C. in Test Example 1.

TABLE 2

| Classification | Heat distortion temperature (° C.) | IZOD impact strength at normal temperature (kg · cm/cm) | Crystallization time (sec) |
|---|---|---|---|
| Comparative Example 1 | 96.9 | 7.1 | 310 |
| Comparative Example 2 | 92.6 | 7.0 | 306 |
| Example 1 | 98.5 | 7.9 | 249 |
| Example 2 | 92.5 | 9.1 | 252 |
| Example 3 | 79.0 | 15.2 | 262 |
| Example 4 | 92.0 | 6.5 | 224 |
| Example 5 | 89.0 | 14.2 | 233 |
| Example 6 | 101.6 | 12.1 | 217 |

Referring to Table 2, first, it can be seen that the heat distortion temperature and IZOD impact strength of the specimen (Comparative Example 1) using the resin processed at the temperature of about 190 to about 200° C. have the same level as physical properties of the specimen (Example 1) using the resin processed at the temperature of about 210 to about 230° C. but the crystallization time is at a high level. Therefore, it can be confirmed that when the resin processed at the temperature of about 210 to about 230° C. is used, a role of the nucleating agent is sufficiently performed.

Further, from the results of Comparative Example 2 and Example 1, it can be seen that in the case where the talc-based nucleating agent is added, the heat distortion temperature is improved by about 6%, IZOD impact strength is improved by about 13%, and the crystallization time of the resin is improved by about 19% through manifestation of the nucleating agent as compared to the case where the talc-based nucleating agent is not added.

Further, from the results of Examples 1 to 3, it can be seen that when the content of the impact modifier is increased, impact strength of the resin is increased but, on the contrary, the heat distortion temperature is reduced and the crystallization time tends to be increased.

Further, from the results of Examples 4 to 6, it can be seen that when the sodium phosphate-based nucleating agent is added in a content of about 0.3 wt %, the crystallization time is reduced as compared to addition of 1 wt % of the talc-based nucleating agent. This shows an effect of manifestation of the nucleating agent to the content of the sodium phosphate-based nucleating agent, that is, an effect of a reduction in crystallization time and an increase in heat distortion temperature according to an increase in crystallization rate and degree of crystallization.

Meanwhile, it can be said that the resin composition according to Example 6 has best physical properties in consideration of hardness, impact strength, and the processing rate of the resin from improvement of the heat distortion temperature by about 10%, IZOD impact strength by about 73%, and the crystallization time by about 29% as compared to Comparative Example 2 to which the nucleating agent is not added.

From synthesis of the aforementioned results, it can be confirmed that in the polylactic acid stereocomplex resin composition according to the present invention, the sodium phosphate-based nucleating agent functions to increase the crystallization rate of the resin and the impact modifier functions to modify an impact of the resin, and thus entire physical properties of the resin composition are balanced due to an increase in kneadability of the polylactic acid, the impact modifier, and the nucleating agent at the processing temperature of about 210 to about 230° C.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for molding a polylactic acid stereocomplex resin composition in an injection molding condition, the method comprising:
   providing a polylactic acid stereocomplex resin composition comprising: (A) about 40 to about 91.9 wt % of a crystalline poly L-lactic acid; (B) about 3 to about 50 wt % of a crystalline poly D-lactic acid; (C) about 5 to about 30 wt % of an impact modifier; and (D) about 0.1 to about 2 wt % of a nucleating agent, the polylactic acid stereocomplex resin composition being processed at an extrusion temperature of about 210 to about 230° C. into a cavity maintained at a surface temperature of about 100 to about 120° C.; and
   performing maintenance and crystallization for about 3 to about 6 minutes, and then cooling a surface of the cavity about 40 to about 60° C. to extract a molded article,
   wherein the cooling is performed at a rate of about 60° C./min or more.

2. The method of claim 1, wherein (A) the crystalline poly L-lactic acid includes about 95 wt % or more of an L form, and (B) the crystalline poly D-lactic acid includes about 98 wt % or more of a D form.

3. The method of claim 2, wherein (A) the crystalline poly L-lactic acid and (B) the crystalline poly D-lactic acid each have a weight average molecular weight of about 40,000 to about 200,000.

4. The method of claim 1, wherein (C) the impact modifier is one or more selected from the group consisting of an acrylate-based copolymer impact modifier, an ethylene-alphaolefin-based impact modifier, a methyl methacrylate-butadiene-styrene-based impact modifier, a silicon-based impact modifier, and a polyester elastomer impact modifier.

5. The method of claim 1, wherein (D) the nucleating agent is a talc-based nucleating agent or a sodium phosphate-based nucleating agent.

6. The method of claim 1, wherein the complex resin composition has a heat distortion temperature (ASTM D-648) of about 100° C. or more and IZOD impact strength (ASTM D-256) of about 10 kg·cm/cm or more.

7. The method of claim 1, wherein the extracted molded article is heat-treated at about 90 to about 120° C. for about 10 to about 60 minutes.

* * * * *